(12) United States Patent
Jeon (10) Patent No.: US 9,529,378 B2
(45) Date of Patent: Dec. 27, 2016

(54) VEHICLE SHIFTER ASSEMBLY

(71) Applicant: Dura Operating LLC, Auburn Hills, MI (US)

(72) Inventor: Jinseok Jeon, LaSalle (CA)

(73) Assignee: Dura Operating, LLC, Auburn Hills, MI (US)

( * ) Notice: Subject to any disclaimer, the term of this patent is extended or adjusted under 35 U.S.C. 154(b) by 146 days.

(21) Appl. No.: 14/550,073

(22) Filed: Nov. 21, 2014

(65) Prior Publication Data

US 2016/0146333 A1    May 26, 2016

(51) Int. Cl.
*G05G 5/05* (2006.01)
*G05G 5/03* (2008.04)
*F16H 59/02* (2006.01)
*F16H 59/10* (2006.01)

(52) U.S. Cl.
CPC ............ *G05G 5/05* (2013.01); *F16H 59/0278* (2013.01); *F16H 59/10* (2013.01); *G05G 5/03* (2013.01)

(58) Field of Classification Search
CPC ............ F16H 59/105; G05G 5/03; G05G 5/05
See application file for complete search history.

(56) References Cited

U.S. PATENT DOCUMENTS

| | | | |
|---|---|---|---|
| 6,298,742 B1 * | 10/2001 | Ey | F16H 59/10 192/220.4 |
| 6,431,339 B1 * | 8/2002 | Beattie | F16H 59/0204 192/220.4 |
| 6,443,026 B1 * | 9/2002 | Arakawa | B60K 20/06 192/220.2 |
| 7,334,497 B2 | 2/2008 | Giefer et al. | |
| 7,571,661 B2 | 8/2009 | Blondeel et al. | |
| 7,784,375 B2 | 8/2010 | Bleckmann et al. | |
| 8,196,491 B2 * | 6/2012 | Wilson | F16H 59/0204 74/473.18 |
| 8,485,061 B2 | 7/2013 | Kliemannel et al. | |
| 8,490,509 B2 | 7/2013 | Giefer et al. | |
| 8,960,040 B2 * | 2/2015 | Wang | F16H 59/10 74/473.12 |
| 9,091,340 B2 * | 7/2015 | Wang | F16H 59/10 |
| 2003/0074999 A1 * | 4/2003 | Shioji | F16H 59/10 74/473.21 |
| 2004/0163924 A1 * | 8/2004 | Wendeberg | B60K 20/02 192/219 |

(Continued)

*Primary Examiner* — David M Fenstermacher
(74) *Attorney, Agent, or Firm* — Reising Ethington P.C.; Matthew J. Schmidt; Robert E. Ford (57) ABSTRACT

A shift lever assembly may be used to shift among gears of a vehicle transmission. The shift lever assembly may be of a so-called shift-by-wire type where a shift lever is not directly mechanically coupled to the transmission but is electrically communicated with the transmission to effect transmission gear changes. A driver may move the shift lever through a shift stroke to cause a transmission gear change, and, for example, when the driver releases the shift lever, an actuator may automatically return the shift lever to a home position during a return stroke. The shift lever assembly may include feedback features that provide feedback to the driver that the shift lever is moving among various positions during the shift stroke, and the assembly may be configured so that the shift lever returns to the home position with less or no feedback features being encountered during the return stroke.

26 Claims, 3 Drawing Sheets

(56) References Cited

U.S. PATENT DOCUMENTS

| | | | |
|---|---|---|---|
| 2005/0022622 A1* | 2/2005 | Mitteer | F16H 59/10 74/473.3 |
| 2005/0160859 A1* | 7/2005 | Buerger | F16H 59/10 74/473.1 |
| 2006/0060019 A1* | 3/2006 | Sato | F16H 59/10 74/473.23 |
| 2011/0005344 A1 | 1/2011 | Haevescher | |
| 2011/0277578 A1 | 11/2011 | McGuire et al. | |
| 2013/0255423 A1 | 10/2013 | Gill et al. | |

* cited by examiner

FIG. 5

VEHICLE SHIFTER ASSEMBLY

TECHNICAL FIELD

The present disclosure relates to a vehicle transmission shifter.

BACKGROUND

In some vehicles, a gear shift lever in a passenger compartment of the vehicle can be moved by an operator of the vehicle to shift the vehicle transmission between its park gear and other gears, such as reverse, neutral and forward drive gears. The shift lever is mechanically coupled to the transmission through a cable that transmits the shift lever movement to a transmission shift mechanism.

Other vehicles use a so-called "shift-by-wire" system wherein an operator shift lever or shift control unit is not physically coupled to the transmission shift mechanism by a cable. Instead, the shift control unit is electrically coupled to a shift actuator that is arranged to shift the transmission upon receipt of a signal from the shift control unit that a transmission gear shift is desired by the operator. In these systems, the position of the shift lever does not necessarily correspond to the currently selected transmission gear.

SUMMARY

A shift lever assembly may be used to shift among gears or modes of a vehicle transmission. The shift lever assembly may be of a so-called shift-by-wire type where a shift lever is not directly mechanically coupled to the transmission but is electrically communicated with the transmission to effect transmission gear changes. A driver may move the shift lever through a shift stroke to cause a transmission gear change, and, for example, when the driver releases the shift lever, an actuator may automatically return the shift lever to a home position during a return stroke. The shift lever assembly may include feedback features that provide feedback to the driver that the shift lever is moving among various positions during the shift stroke, and the assembly may be configured so that the shift lever returns to the home position with less or no feedback features being encountered during the return stroke.

In at least some forms, a vehicle shifter assembly may include a shift lever movable during a control movement to cause a vehicle transmission shift and during a return movement that positions the shift lever for a subsequent control movement. A tactile feedback device has feedback features that are selectively engaged during at least some portion of the shift lever movement to provide tactile feedback through the shift lever. And the shift lever is coupled to the feedback features during the control movement and decoupled from the feedback features during the return movement to limit or prevent feedback through the shift lever during the return movement. In at least some implementations, a ball couples the shift lever to the tactile feedback device and the ball is aligned with a selector path that includes the feedback features during the control movement and the ball is not aligned with the selector path during the return movement so that the ball engages fewer or none of the feedback features during the return movement.

In at least some implementations a vehicle shift lever assembly includes a shift lever movable to permit changing a transmission mode, a selector path, a return path, a coupler and an actuator. The selector path includes multiple stations through which the shift lever may be moved and including a home station. The stations may correspond to different transmission modes, and the selector path has feedback features between at least some adjacent stations that provide an indication that the shift lever has been moved from one station to the next as the shift lever is moved to change from one transmission mode to another. The return path is separate from at least a portion of the selector path and at least some of the feedback features. The coupler is associated with the shift lever and selectively associated with the selector path and the return path in response to movement of the shift lever, the coupler may be positioned in various ones of the stations during at least some movement of the shift lever. The coupler is responsive to the feedback features as the shift lever is moved. The actuator moves the shift lever to the home station when the shift lever has been moved away from the home station and in the absence of a greater counterforce on the shift lever. The coupler, selector path and return path are arranged to align the coupler with the return path when the shift lever is moved by the actuator.

In at least some implementations, a vehicle shift lever assembly includes a shift lever movable to permit changing a transmission mode, a coupler associated with the shift lever, a selector path and a return path. The selector path includes multiple stations in which at least a portion of the coupler may be positioned and including a home station, the stations corresponding to different transmission modes. The selector path has feedback features between at least some stations that provide an indication that the shift lever has been moved from one station to the next as the shift lever is moved to change from one transmission mode to another. The return path is separate from at least a portion of the selector path and at least some of the feedback features. And the coupler is associated with the selector path during movement of the shift lever wherein the distance between the coupler and the home station increases and the coupler is associated with the return path during movement of the shift lever wherein the distance between the coupler and the home station decreases.

Other embodiments can be derived from combinations of the above and those from the embodiments shown in the drawings and the descriptions that follow.

BRIEF DESCRIPTION OF THE DRAWINGS

The following detailed description of preferred implementations and best mode will be set forth with regard to the accompanying drawings, in which.

DETAILED DESCRIPTION OF PREFERRED EMBODIMENTS

Figure 1:
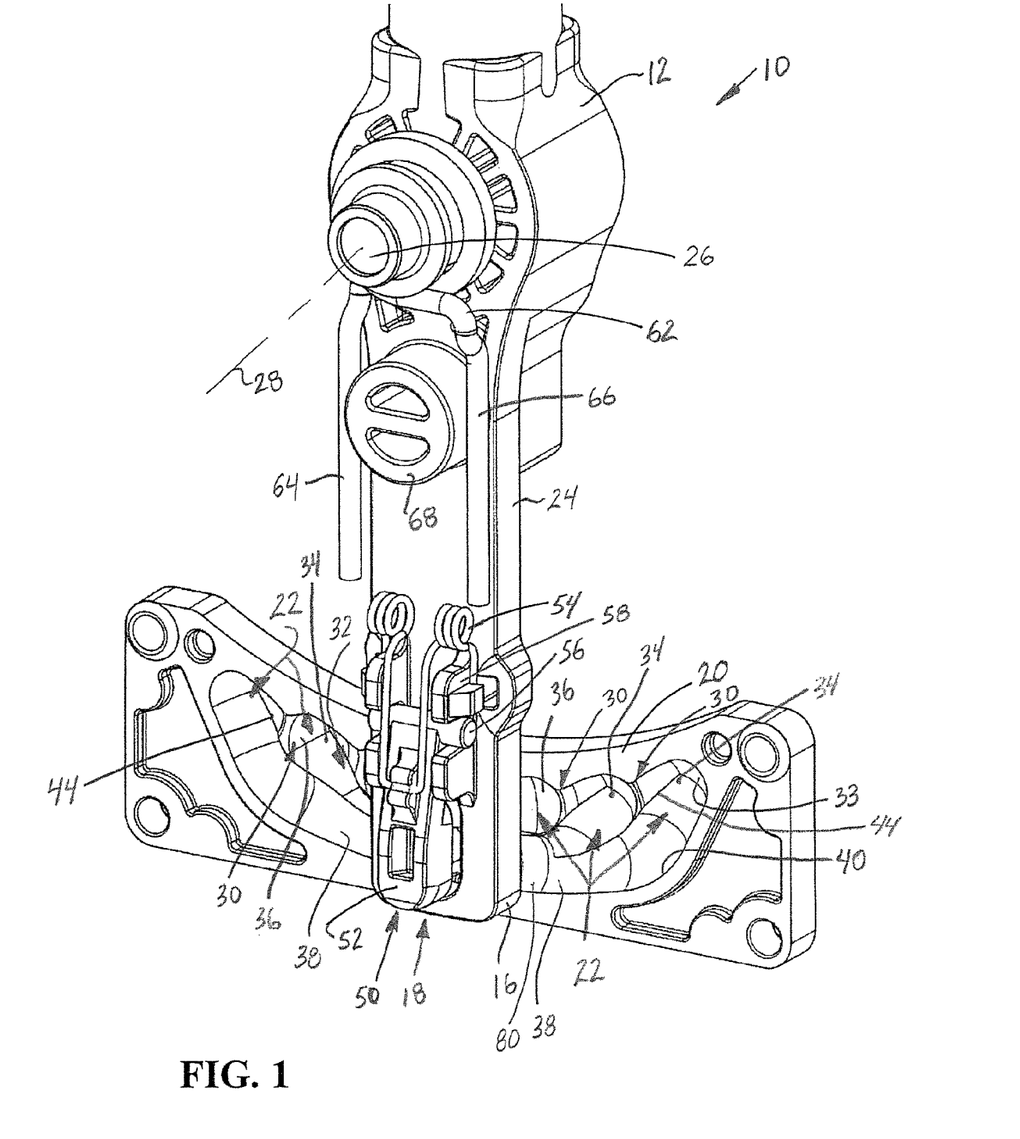
FIG. 1 is a perspective view of a portion of a vehicle shifter assembly showing a portion of a vehicle shift lever and a selector body.

Referring in more detail to the drawings, FIG. 1 shows a vehicle shift lever assembly 10 that may be used to change a mode of a vehicle transmission (e.g. cause a transmission gear change). The assembly 10 includes a gear shift lever 12 that may be moved by a driver of the vehicle to shift the transmission among various modes, typically including park, neutral, reverse and forward drive gears. The shifting system of which the shift lever assembly 10 is a part may be a so-called "shift by wire" system where an operator command for a gear shift is electrically transmitted to a transmission shift actuator that is coupled to a shift mechanism of the transmission to cause the actuator to shift the transmission. There can be many different ways to generate an electrical signal to monitor/detect lever position and send the signal to the electronic control unit (ECU) to actuate the shift actuator to a desired drive mode or gear. As an example, a magnet may be attached to the shift lever, and an angular hall effect sensor may be mounted on a printed circuit board (PCB) with an ECU, and as the shift lever rotates or tilts the hall effect sensor measures the magnetic flux densities of two axis and calculates the angle of the shift lever and determines the drive mode that the driver selected. Of course, other arrangements may be implemented.

In at least some implementations, the shift lever 12 may be manipulated at one end or portion by a driver to cause a transmission gear change and may be associated at a second portion 16, via a coupler 18, with a selector body 20 to facilitate the driver commanded gear change. The selector body 20 may include multiple stations 22 and the coupler 18 moves with the shift lever 12 and into and out of one or more of the stations 22 during a transmission gear shift. The stations 22 may correspond with different transmission modes such that movement of the coupler 18 from one station to the next causes a transmission gear shift, such as by causing an electrical signal to be sent to a transmission shift actuator. The electrical signal could be provided, for example, as a function of detected movement of the shift lever 12 and/or movement of the coupler 18 relative to the selector body 20. Further details of the components and their interaction are provided below.

The shift lever 12 may include an elongated body 24 connected between its ends to a shift lever housing or other vehicle structure at a pivot 26 so that the shift lever 12 rotates about the pivot 26. Hence, at least in some implementations, the second end 16 of the shift lever 12 moves in an arc about the axis 28 of the pivot 26 as the shift lever is moved. The shift lever 12 is moved (e.g. pushed or pulled) by a vehicle driver to cause a transmission shift. The shift lever 12 could move in a manner other than the pivoted manner shown in the drawings and described above, as desired.

The second portion 16 of the shift lever 12 moves relative to the selector body 20 which may be fixed relative to the shift lever 12 in at least certain implementations. In the implementations shown, the selector body 20 defines multiple discrete stations 22 through which the shift lever 12 may be moved. The selector body 20 also has feedback features 30 between adjacent stations 22 that provide an indication (e.g. tactile feedback) that the shift lever 12 has been moved from one station to the next as the shift lever is moved to change from one transmission mode to another. The stations 22 may be oriented along a selector path 32 defined in the selector body 20.

In at least some implementations, the selector path 32 may be defined by a groove or track 33 formed in or by the selector body 20. The track may be contoured and the stations 22 may be defined by low spots or detents 34 in the track 33 and the feedback features 30 may include or be defined at least in part by control features which may be raised surfaces 36 or ramps in the track between adjacent detents. The detents 34 and raised surfaces 36 define control surfaces that cause some movement of the coupler 18 or selector body 20 during a transmission shift. The coupler 18 may include a portion that is biased against the selector body 20 in the track 33 and rides from one detent 34, over a raised surface 36, and into the next detent 34 when the shift lever 12 is moved. The selector body 20 may further include a return path 38 which may be at least partially separate from the selector path 32 and may be spaced from and not include one or more, or any of the feedback features 30 or the stations 22. The return path 38 may be defined by a groove 40 or contoured surface of the selector body 20 and may include segments 42 (FIGS. 2 and 3) that extend adjacent to the stations 22. The segments may lead to a common return path (e.g. the segments may merge into a return path groove or track in the selector body). The segments may have a bottom 43 (FIG. 2) at the same height or level as the detents providing a smooth transition to the return path, and/or they may be separated from the detents 34 by a control surface which may be implemented as a raised surface or bump. The control surface may be defined by a raised and angled wall 44 that funnels or directs the ball into the return path so that the ball does not remain in the selector path during the return stroke.

The coupler 18, or a portion thereof, may contact and be moved along the selector path track 33 as the shift lever 12 is moved, and the contours of the track 33 may provide tactile feedback to a person moving the shift lever that the shift lever is moving among the various stations 22, which the driver will associate with changing or shifting among the various gears of the transmission. In a vehicle having Park, Reverse, Neutral and Drive modes or gears, the driver would expect to move through two stations 22 and into a third station 22 to shift the vehicle transmission from park to drive, and vice versa, with these shifts occurring with movement of the shift lever 12 in opposite directions (e.g. forward and backward, up and down, or left and right, etc). A central station 23, in the implementation shown, may define a home position of the shift lever.

Figure 5:
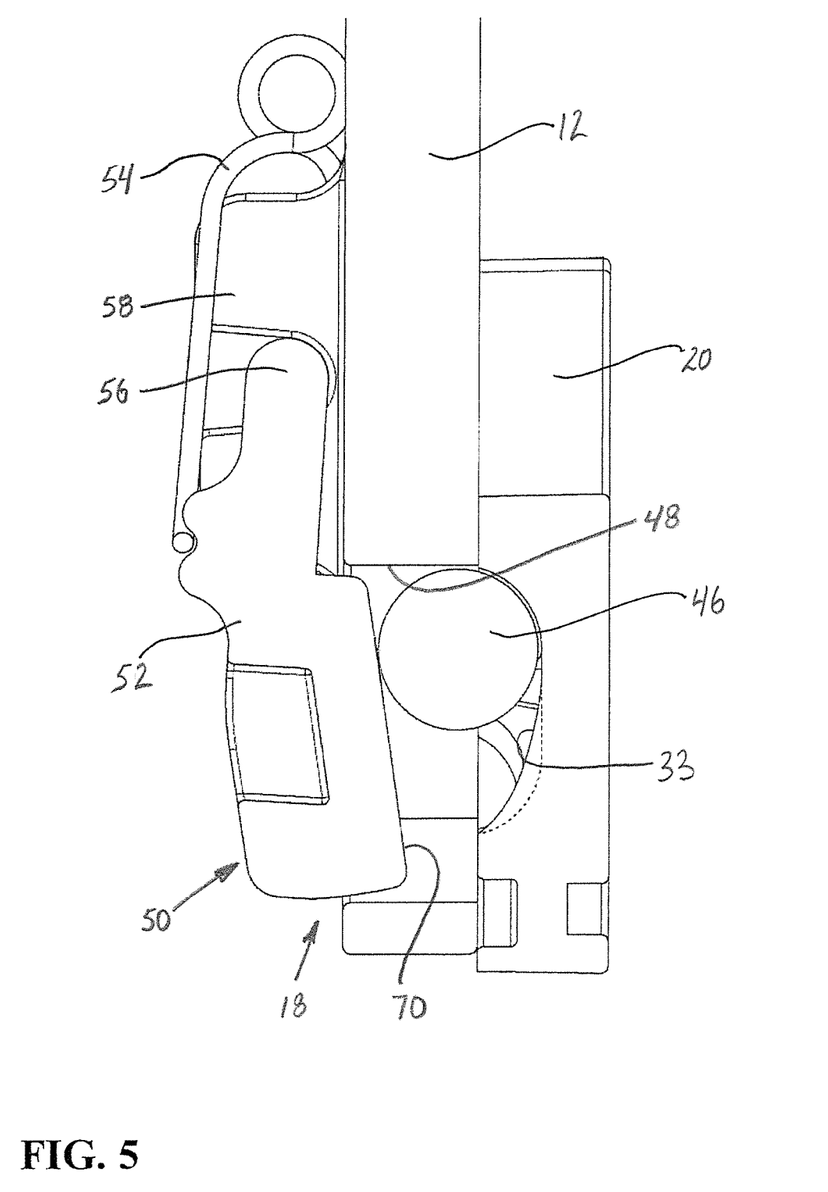
FIG. 5 is a sectional view showing the shift lever, retainer, ball and selector body.

The coupler 18 may be operably associated with the shift lever 12 and moved relative to the selector body 20 as the shift lever is moved to cause a transmission gear change. In the implementation shown, the coupler 18 includes a ball 46 (FIGS. 3 and 5) that is partially trapped in a slot 48 or cavity formed in the shift lever 12. The ball 46 may be held against the selector body 20 by a retainer 50 so that it is responsive to the contours of the selector and return paths 32, 38.

The retainer 50 may include a body 52 acted upon by a biasing member 54 to yieldably bias the ball 46 against the selector body 20. The retainer body 52 may be pivoted about a finger 56 received in a bracket 58 on the shift lever 12 so that the retainer body 52 is carried by the shift lever 12 and can pivot relative to the shift lever 12 about an axis 60 (FIG. 2) at an angle to the shift lever pivot axis 28. In the implementation shown, the axis 60 is perpendicular to the axis 28. This permits movement of the ball 46 relative to the shift lever 12 as the ball is displaced by the contours of the selector and return paths 32, 38. In the implementation shown, the contours of the selector path 32 displace the ball 46 in a direction generally parallel to the axis 28 of the shift lever pivot 26 and generally perpendicular to the path of travel of the shift lever 12 as it rotates about the pivot 26. Even with the retainer 50 being permitted to pivot, the movement of the ball 46 along the contoured track 33 provides tactile feedback noticeable by the person moving the shift lever 12. This feedback is in the form of increased effort needed to move the shift lever 12 as the ball 46 moves out of one detent 34 and passes over a ramp 36, and a decreased effort needed to move the shift lever 12 as the ball 46 clears a ramp 36 and enters an adjacent detent 34. This feedback corresponds to the transmission shifting from one mode to the next in the series of transmission modes.

Instead of moving the coupler/ball, the selector body or track 33 may also be moved relative to the coupler, providing relative motion between the coupler and track to provide tactile feedback through the shift lever. Additionally, both the coupler and the track may be moved relative to each other, if desired, where relative movement between the coupler and feedback features provides desired feedback through the shift lever or otherwise. In view of these options, in at least some implementations: 1) the shift stroke can be described as movement of the shift lever wherein the distance between the coupler and the home station increases, and 2) the return stroke can be described as movement of the shift lever wherein the distance between the coupler and the home station decreases.

Figure 2:
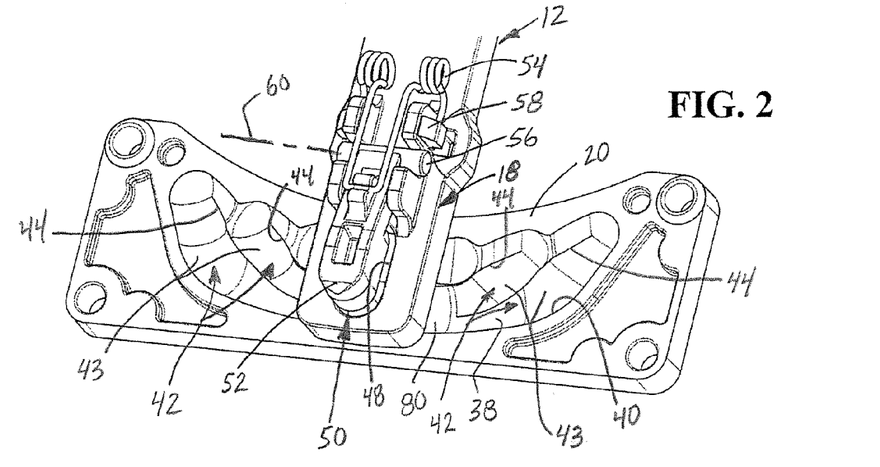
FIG. 2 is a perspective view of a portion of a vehicle shifter assembly.
Figure 3:
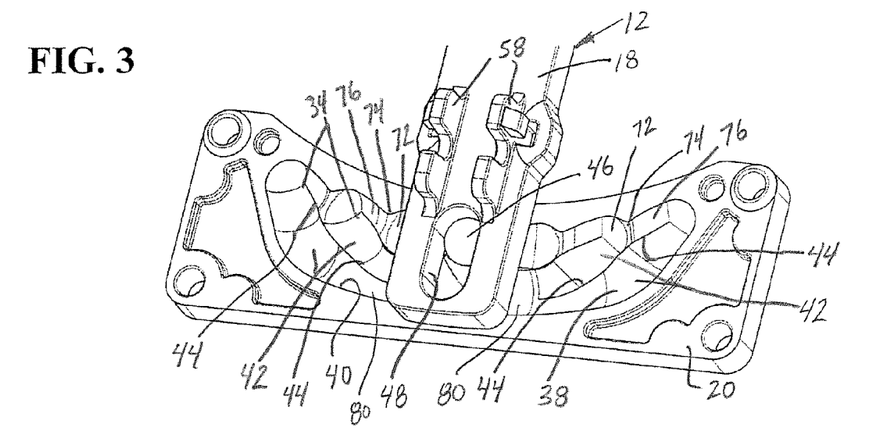
FIG. 3 is a perspective view of a portion of a vehicle shifter assembly with a retainer and biasing member removed to show an internal ball.

In at least some implementations, the shift lever 12 is yieldably biased by an actuator 62 toward a home position. When a force moving the shift lever 12 to cause a transmission gear change is no longer applied to the shift lever, the actuator 62 returns the shift lever to the home position (which is shown in FIGS. 1-3). This is a so-called monostable shifting arrangement, although other arrangements may be used including arrangements wherein the shift lever is biased or movable to more than one position. In the implementation shown, the actuator is a spring 62, and more specifically, a torsion spring. The torsion spring 62 has two legs 64, 66 that can each be moved away from the other leg but are restrained, such as by a bracket or other structure, from moving in a direction toward the other leg. In the implementation shown, the shift lever 12 includes a boss or tab 68 located between the spring legs 64, 66 and which engages one of the legs 64 when the shift lever 12 is rotated clockwise about the pivot 26 and engages the other leg 66 when the shift lever 12 is rotated counterclockwise about the pivot. Therefore, movement of the shift lever 12 in either direction causes the spring 62 to exert a force on the shift lever 12 through the tab 68 that increases with more movement away from the home position, and the force tends to return the tab 68 to its home position, centered between the spring legs 64, 66. This correspondingly returns the shift lever 12 to its home position, and this occurs when a greater opposing force is not applied to the shift lever.

Because the shift lever 12 may be moved in either direction from the home position to change the transmission mode, depending upon the current transmission mode and desired transmission mode, the home station 23 (labeled in FIG. 4) preferably is the middle or center most station in the selector body 20. In the example shown in FIGS. 1-4, the selector body 20 has seven stations 22. The home station 23 is the middle station and three stations 22 are provided on either side of the home station 23. Hence, if the vehicle transmission is in drive, the driver may wish to shift into park which would require moving the shift lever 12 in a first direction (e.g. clockwise) through neutral and reverse gears before reaching park, as in a traditional shift lever arrangement. Conversely, if the vehicle transmission is in park and the drivers wishes to shift into drive, the shift lever 12 would be moved in a second direction (e.g. counterclockwise) through reverse and neutral before reaching drive. Thus, in a transmission having P, R, N and D modes, the maximum modes to shift through in either direction is three, so there are three stations 22 on either side of the home station 23. Of course, other arrangements can be provided, as desired.

As described above, during a driver commanded transmission gear change, the shift lever 12 is moved (e.g. rotated about the pivot) and the ball 46 moves among and is received in various ones of the stations 22. The ball 46 is held in the selector path 32 by the retainer 50, which may be biased by the spring 54 and have a contoured or inclined surface 70 (FIG. 5) to help keep the ball 46 in the selector path 32 during this shift lever movement. As also described above, when the transmission gear change has been completed, the actuator 62 moves the shift lever 12 back to its home position. As this occurs, the ball 46 is moved into the return path 38 such as by being guided into the return path by one of the control surfaces/angled walls 44 and into a segment 42 of the return path 38 that is adjacent to the station 22 that the ball 46 was moved into during the transmission gear change.

This occurs because the force needed to move the ball 46 into the return path 38 during the return stroke of the shift lever 12 is less than would be required to move the ball 46 back over the raised surfaces 36 that exist between the stations 22 in the selector path 32. In other words, the resistance to the ball 46 moving back over the raised surfaces 36 in the selector path 32 during the return stroke, in the direction opposite to the shift stroke, is greater than the resistance to the ball 46 moving into the return path 38. This may be accomplished, in at least some implementations, by designing the size and shape of the raised surfaces 36 and the control surfaces 44 to provide the desired movement of the ball 46 during the shift stroke and return stroke of the shift lever 12.

Figure 4:
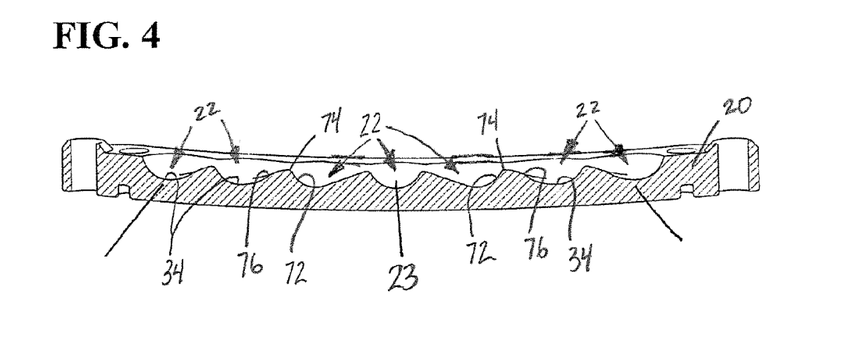
FIG. 4 is a sectional view of the selector body.

In the implementation shown, the raised surfaces 36 and detents 34 are angled to be more receptive of the ball 46 during a shift stroke of the shift lever 12, and are angled against movement of the ball 46 in the selector path 32 during the return stroke of the shift lever 12. As shown in FIGS. 3 and 4, this can be thought of in terms of the stations 22 having a front surface 72 (i.e. a first control surface) leading from a detent 34 to a peak 74 which leads to a rear surface 76 (i.e. a second control surface). Hence, a station 22 may be defined at least in part by the rear surface 76 of a preceding station 22 (if there is one), a detent 34, a front surface 72 adjacent to the detent 34, and a third control surface 44 or separator between the selector path 32 and the return path 38. During a shift stroke the ball 46 travels over the front surface 72 before reaching the peak 74 and then the ball moves over the peak 74 before traveling over the rear surface 76 toward the next detent 34 (if there is one—the last station may simply include a wall that prevents further movement).

In the direction of the shift stroke, the front surface 72 provides less resistance to movement of the ball 46 than does the adjacent portion of the control surface 44 so the ball 46 remains in the selector path 32 and does not enter the return path 38 during the shift stroke. However, the rear surface 76 and adjacent portion of the control surface 44 guide the ball 46 into the return path 38 rather than over the rear surface 76 and back over the adjacent peak 74 during the return stroke. Hence, the ball 46 stays in the selector path 32 during the shift stroke but is moved into the return path 38 during the return stroke. Because the shift stroke may proceed in either direction from the home station 23, the stations 22 on opposite sides of the home station 23 may be mirror images, if desired, to provide similar feel and control of the ball 46 during the shift and return strokes. Further, the mechanical structures/physical control surfaces 44, 72, 76 may provide consistent and repeatable feedback and control of the transmission shifting.

The return path 38 may lead to the home station 23 so that, upon completion of the return stroke, the ball 46 is moved into the home station 23. This resets the shift lever 12 for a subsequent shift stroke for a transmission gear change. The return path 38 may be relatively smooth to avoid undesired tactile feedback to the driver during the return stroke as the transmission is not being shifted during the return stroke. The return path 38 may include some contour to control the rate of the shift lever movement during all or part of the return stroke. For example, a slight or relatively shallow incline 80 may be provided in the area of the home station 23 to slow shift lever movement in that area and provide a more gentle, controlled return movement. The return path 30 may also be sloped to facilitate moving the ball 46 within the shift lever slot 48 so that the ball 46 is realigned with the selector path 32 when returned to the home station 23. The slopes and inclines in the return path 38 may be provided on either side of the home station 23, sloping in opposite directions from each other, to control movement in either direction relative to the home station 23 (i.e. toward the home station from either direction). The angle of the retainer surface 70 and the force provided its biasing spring 54 may also aid or cause movement of the ball 46 in the slot 48 for registry with the selector path 32.

In at least some implementations, a station 22 may be defined at least in part by a detent 34 or floor and a plurality of control surfaces 44, 72, 76 or walls adjacent to the detent 34. The arrangement of the control surfaces 44, 72, 76 may determine whether the coupler 18 follows the selector path 32 or the return path 38 during movement of the shift lever 12. This may be done by providing the control surfaces 44, 72, 76 in such a way that the net force on the ball 46 maintains the ball within the selector path 32 during movement of the ball away from the home station 23 and the net force on the ball 46 moves the ball into and within the return path 38 during movement of the ball toward the home station 23. As noted above, the ball 46 may be acted upon by more than the control surfaces, for example, surfaces within the retainer 50 holding the ball 46 and one or more biasing members 54 that provide a force on the ball 46 directly or through one or more other surfaces or components.

In at least certain implementations, the shift lever 12 does not directly, mechanically shift the transmission so the shift lever need not remain in driver selected positions that correspond to certain transmission modes or gears. Instead, as noted above, after a transmission shift event the shift lever 12 can be returned to a home position 23 and reset for future shifting. The return stroke of the shift lever 12 may happen automatically (e.g. without driver input) and the shift lever assembly 10 can be designed to permit the return stroke to occur along a return path 38 that is separate from at least some of the feedback features 30 present in the selector path 32 used during a shift stroke. During the return stroke, this limits or prevents feedback to the user that the user may associate with unintended transmission shifting or slipping of the shift lever 12 or an associated component. On the other hand, during a shift stroke, appropriate feedback may be provided to a user to facilitate an intended shift of the vehicle transmission. Further, if desired, the feedback provided in this shift-by-wire system may mimic a transmission shift in a system where the shift lever 12 is mechanically linked to the transmission, which many drivers are familiar and comfortable with. This may facilitate customer use and acceptance of the shift-by-wire system.

In the above description, the coupler is noted as being associated and movable with the shift lever. However, the coupler may be held stationary, and the selector body may be associated and movable with the shift lever to move the selector path and its stations relative to the coupler. A further alternative allows movement of both the coupler and the selector body. Regardless of which component(s) move with the shift lever, the coupler may be positioned within successive stations and may be responsive to feedback features in the selector path during a shift stroke, and registered with the return path during a return stroke. In at least some implementations, the portion of the coupler received within the stations is a ball, but a different feature or component may be used. And the selector body may be carried by or formed as part of the shift lever. That is, the detents, control surfaces and other features described above with regard to the selector body could be formed as integral features within the shift lever, or a portion thereof.

In at least some forms, the vehicle shifter assembly may include a shift lever movable during a control movement (e.g. a shift stroke) to cause a vehicle transmission shift and during a return movement (e.g. a return stroke) that positions the shift lever for a subsequent control movement. A tactile feedback device, like but not limited to the selector body, has feedback features that are selectively engaged during at least some portion of the shift lever movement to provide tactile feedback through the shift lever. In at least some implementations, the shift lever is coupled to the feedback features during the control movement and decoupled from the feedback features during the return movement. This limits or prevents feedback through the shift lever during the return movement. In at least some implementations, a ball couples the shift lever to the tactile feedback device and the ball is aligned with a selector path that includes the feedback features during the control movement and the ball is not aligned with the selector path during the return movement so that the ball engages fewer or none of the feedback features during the return movement.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A vehicle shift lever assembly, comprising:
a shift lever movable to permit changing a transmission mode;
a selector path including multiple stations through which the shift lever may be moved and including a home station, the stations corresponding to different transmission modes, the selector path having feedback features between adjacent stations that provide an indication that the shift lever has been moved from one station to the next as the shift lever is moved to change from one transmission mode to another;
a return path separate from at least a portion of the selector path and at least one of the feedback features;
a coupler associated with the shift lever and selectively associated with the selector path and the return path in response to movement of the shift lever, the coupler being positioned in one or more stations during at least a portion of the movement of the shift lever and the coupler is responsive to the feedback features during relative movement between the coupler and the stations; and
an actuator that moves the shift lever to the home station when the shift lever has been moved away from the home station and in the absence of a greater counterforce on the shift lever, the coupler, selector path and return path being arranged to position the coupler within the return path when the shift lever is moved by the actuator.

2. The assembly of claim 1 wherein the actuator includes a biasing member that yieldably biases the shift lever to a position wherein the coupler is in the home position.

3. The assembly of claim 1 wherein the selector path includes multiple detents with each detent corresponding to a station, and the feedback features include raised surfaces located between the detents, and wherein the coupler moves within the selector path, over the raised surfaces and into the detents to provide an indication that a transmission mode change has been effected, and this movement of the coupler may be achieved by moving the coupler relative to the selector path, moving the selector path relative to the coupler or both.

4. The assembly of claim 3 wherein the engagement of the coupler with the detents and raised surfaces displaces the shift lever to provide the indication, and the indication is noticeable by a user moving the shift lever.

5. The assembly of claim 3 wherein the selector path is communicated with the return path so that the coupler can be selectively aligned with the return path, and when a force moving the shift lever and causing relative movement between the coupler and the selector path is removed from the shift lever, the actuator moves the shift lever to a position wherein the coupler is in the home station and during this movement of the shift lever the coupler is aligned within the return path and there is relative movement between the coupler and the return path.

6. The assembly of claim 3 wherein the coupler includes a ball that is operably coupled to the shift lever so that the ball rides in the selector path as the shift lever is moved during a shift stroke.

7. The assembly of claim 1 which also comprises a selector body and wherein the selector path and the return path are formed in the selector body.

8. The assembly of claim 7 wherein the return path is defined by a groove in the selector body and the groove has segments with each segment extending adjacent to a respective one of the detents.

9. The assembly of claim 6 wherein the shift lever includes a slot and the ball is trapped in the slot for movement with the shift lever as the shift lever moves and the ball is movable relative to the shift lever within the slot so that the ball may move from the selector path to the return path and vice versa.

10. The assembly of claim 1 wherein a station is at least partially defined by a plurality of control surfaces adjacent to a detent and the control surfaces determine whether the coupler follows the selector path or the return path.

11. The assembly of claim 10 wherein the control surfaces are arranged so that the net force on the coupler maintains the coupler within the selector path during movement of the coupler away from the home station and the net force on the coupler moves the coupler in the return path during movement of the coupler toward the home station.

12. A vehicle shift lever assembly, comprising:
a shift lever movable to permit changing a transmission mode;
a coupler associated with the shift lever;
a selector path including multiple stations in which the coupler may be positioned and including a home station, the stations corresponding to different transmission modes, the selector path having feedback features between adjacent stations that provide an indication that the shift lever has been moved from one station to the next as the shift lever is moved to change from one transmission mode to another; and
a return path separate from at least a portion of the selector path and at least one of the feedback features, wherein the coupler is associated with the selector path during movement of the shift lever wherein the distance between the coupler and the home station increases, and the coupler is associated with the return path during movement of the shift lever wherein the distance between the coupler and the home station decreases.

13. The assembly of claim 12 wherein the selector path includes multiple detents with each detent corresponding to a station, and the feedback features include raised surfaces located between adjacent detents, and wherein the coupler is aligned in the selector path for relative movement relative to the selector path over the raised surfaces and into the detents to provide an indication that a transmission mode change has been effected.

14. The assembly of claim 13 wherein the coupler displaces the shift lever during relative movement between the coupler and the feedback features to provide the indication, and the indication is noticeable by a user moving the shift lever.

15. The assembly of claim 13 wherein the selector path is communicated with the return path so that the coupler can selectively be aligned with the return path, and when a force moving the shift lever and causing relative movement between the coupler and the selector path is removed from the shift lever, the shift lever is returned to a position wherein the coupler is in the home station and during this movement of the shift lever the coupler is aligned with the return path.

16. The assembly of claim 13 wherein the coupler includes a ball that is operably coupled to the shift lever so that the ball rides in the selector path as the shift lever is moved during a shift stroke wherein the distance between the ball and the home station increases.

17. The assembly of claim 12 which also comprises a selector body and wherein the selector path and the return path are formed in the selector body.

18. The assembly of claim 17 wherein the return path is defined by a groove in the selector body and the groove has segments with each segment extending adjacent to a respective one of the detents.

19. The assembly of claim 16 wherein the coupler or the shift lever includes a slot and the ball is trapped in the slot for movement with the shift lever and relative to both the selector path and the return path as the shift lever moves, and the ball is movable relative to the shift lever within the slot so that the ball may move from the selector path to the return path and vice versa.

20. The assembly of claim 12 wherein a station is at least partially defined by a plurality of control surfaces adjacent to a detent and the control surfaces determine whether the coupler follows the selector path or the return path during movement of the shift lever.

21. The assembly of claim 16 wherein a station is at least partially defined by a plurality of control surfaces adjacent to a detent and the control surfaces are arranged so that the net force on the ball maintains the ball within the selector path during movement of the ball away from the home station and the net force on the ball moves the ball in the return path during movement of the ball toward the home station.

22. A vehicle shifter assembly, comprising:
a shift lever movable during a control movement to cause a vehicle transmission shift and during a return movement that positions the shift lever for a subsequent control movement; and
a tactile feedback device having feedback features that are selectively engaged during at least a portion of the shift lever movement to provide tactile feedback through the shift lever and one or more control surfaces arranged adjacent to one or more feedback features to cause the shift lever to not engage the feedback features during the return movement, wherein the shift lever is coupled to the feedback features during the control movement and a portion of the shift lever engages at least one control surface so that the shift lever is automatically decoupled from the feedback features during the return movement to limit or prevent feedback through the shift lever during the return movement.

23. The assembly of claim 22 wherein the tactile feedback device includes multiple stations and at least one of the feedback features are provided between adjacent stations.

24. The assembly of claim 22 wherein the feedback features include one or both of detents and raised surfaces.

25. The assembly of claim 22 which also includes a coupler engageable with the feedback features during the control movement and associated with the shift lever, wherein the coupler is moveable relative to the feedback features so that the coupler engages fewer or none of the feedback features during the return movement.

26. The assembly of claim 25 wherein the coupler moves with the shift lever and the coupler is movable relative to the shift lever so that the coupler is in one position relative to the shift lever during the control movement and is in a different position relative to the shift lever during at least a portion of the return movement.

* * * * *